W. L. LAWRENCE.
MAUSOLEUM.
APPLICATION FILED JUNE 21, 1911.
1,041,637.
Patented Oct. 15, 1912.
2 SHEETS—SHEET 1.
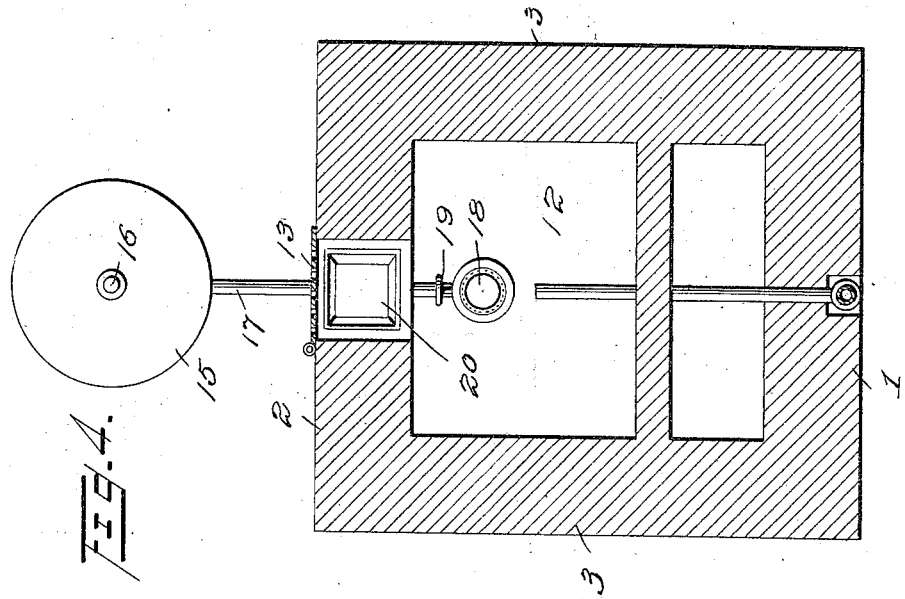
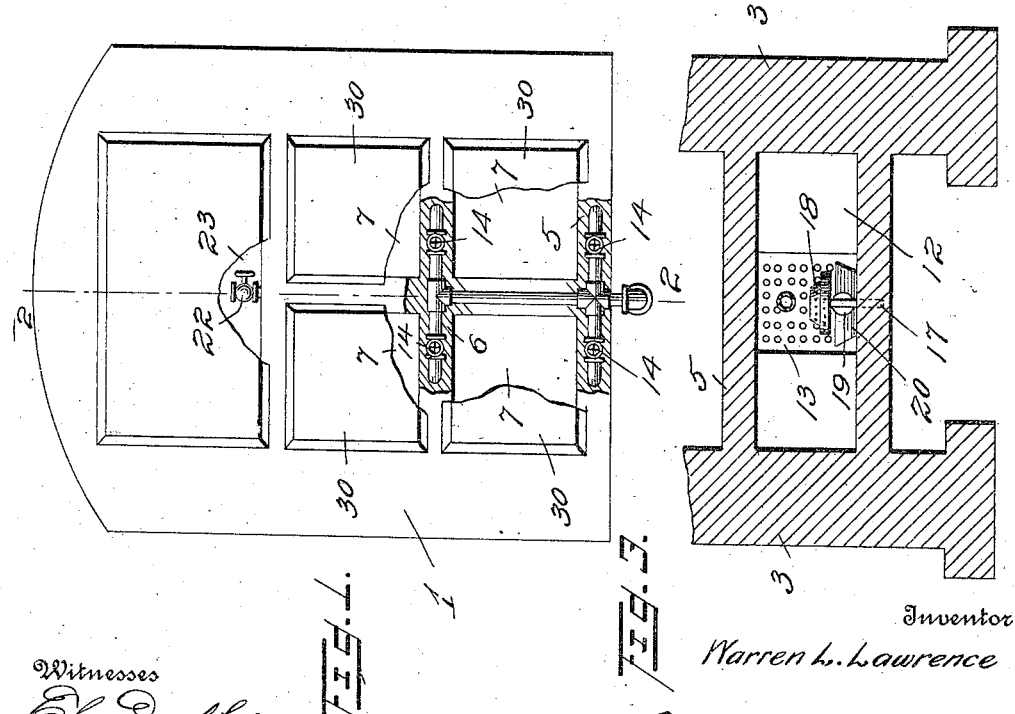
Inventor
Warren L. Lawrence
By Victor J. Evans
Attorney
Witnesses W. L. LAWRENCE.
MAUSOLEUM.
APPLICATION FILED JUNE 21, 1911.
1,041,637.
Patented Oct. 15, 1912.
2 SHEETS—SHEET 2.
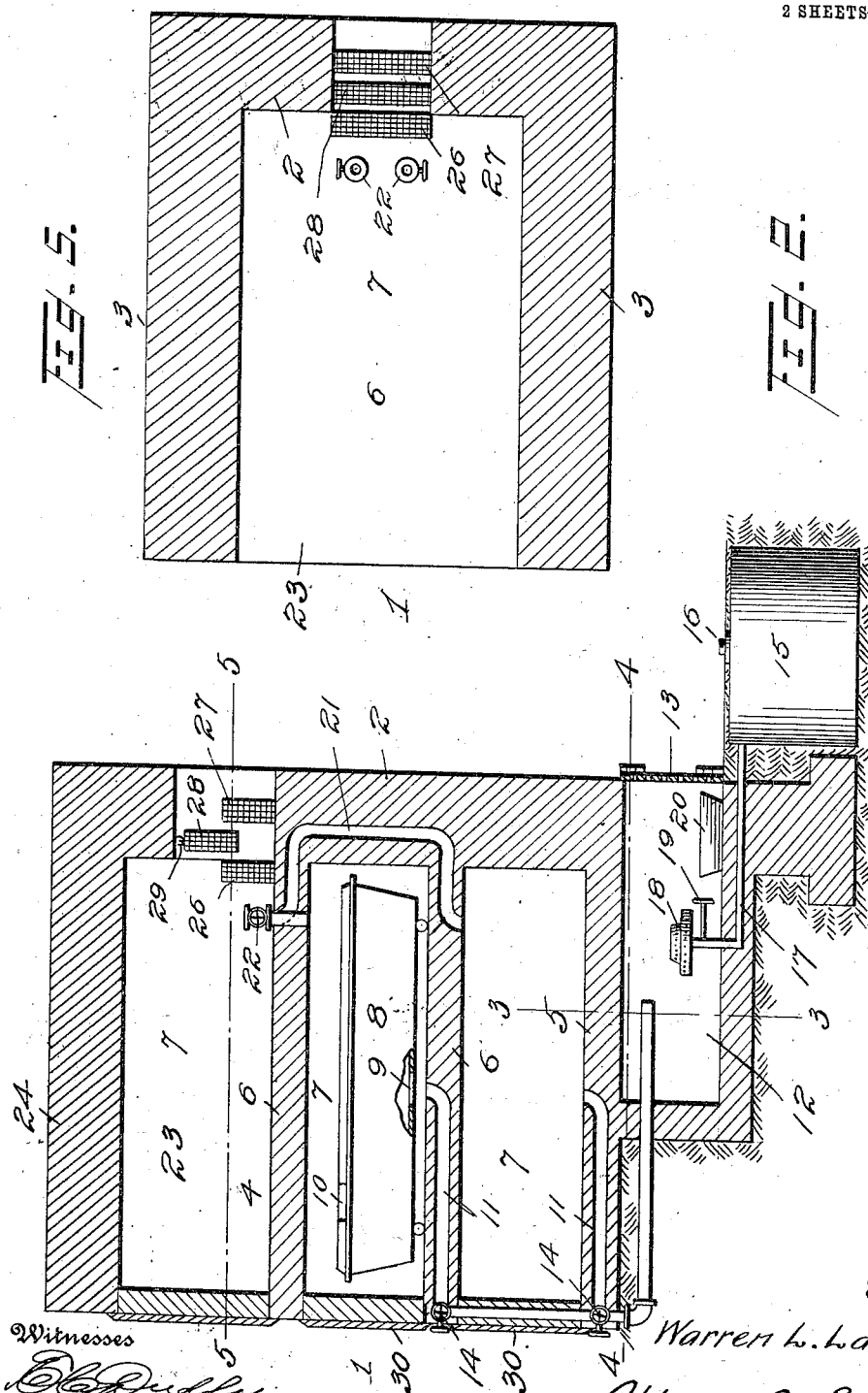
Inventor
Warren L. Lawrence
By Victor J. Evans
Attorney
Witnesses

UNITED STATES PATENT OFFICE.

WARREN L. LAWRENCE, OF EUREKA, ILLINOIS.

MAUSOLEUM.

1,041,637.  Specification of Letters Patent.  Patented Oct. 15, 1912.

Application filed June 21, 1911. Serial No. 634,448.

*To all whom it may concern:*

Be it known that I, WARREN L. LAWRENCE, a citizen of the United States, residing at Eureka, in the county of Woodford and State of Illinois, have invented new and useful Improvements in Mausoleums, of which the following is a specification.

This invention relates to crypts, burial vaults, mausoleums or the like and particularly to means used in connection therewith for desiccating the bodies placed therein and for maintaining them in practically airtight compartments after desiccation.

A further object of the invention is the provision of a mausoleum or the like having means for desiccating the bodies placed therein and for drying the air prior to heating the same so that perfectly dry air is received into the compartments and also for removing the germs from the air expelled from the mausoleum.

Further objects of the invention will appear as the following specific description is read in connection with the accompanying drawings, which form a part of this application, and in which:—

Figure 1 is a front elevation with parts broken away. Fig. 2 is a section on the line 2—2 of Fig. 1. Fig. 3 is a section on the line 3—3 of Fig. 2. Fig. 4 is a horizontal section on the line 4—4 of Fig. 2. Fig. 5 is a horizontal section on the line 5—5 of Fig. 2.

Referring more particularly to the drawings, 1 represents the front, 2 the back wall, 3 the side walls, 4 the top and 5 the bottom. The side walls may be in the form of partitions and the following described device duplicated as many times as is found necessary for community mausoleum or the like. The front and back walls have connected thereto or formed as a part thereof the floors or horizontal partitions 6 which, with the front and back walls and the side walls, form compartments 7 in which the coffins or caskets 8 are placed. Each casket 8 is preferably formed with a hole 9 in the bottom and the glass of the same is broken away or slid back, as shown at 10, to provide a passage for heated air through the same. The opening 9 is located immediately over the end of a discharge pipe 11 which is embedded in the horizontal partition and in the vertical front wall extending from the discharge end below the bottom 5 and into a compartment 12 which is formed below the bottom and is closed by a perforated door 13 hinged to the back wall. Each compartment is supplied with a pipe or similar design having a valve 14 therein which is adapted to cut off the air to the compartments, for a purpose to be hereinafter described.

Embedded in the ground at a suitable distance from the mausoleum is a fuel supply tank 15 having a supply nipple 16 projecting above the ground and a supply pipe 17 leading into the compartment 12 where it is furnished with a burner 18 controlled by a valve 19. Between the burner 18 and the perforated door 13 there is preferably placed a pan 20 adapted to contain a suitable quantity of sodium chlorid or other moisture absorbing material which takes up the moisture entering through the door 13 and insures practically dry air being fed to the pipes 11. The air, after passing through the pipes and through the caskets 8, is discharged through outlet pipes 21 which extend up through the top 4 and are provided with valves 22 located in the compartment 23 between the top 4 and the roof 24.

In order that the air passing out of the discharge pipes 21 may be properly treated to prevent the spread of disease there is formed in the rear wall, between the top 4 and the roof 24, an opening 25 and at the inner portion of the opening separate cages 26 and 27 are mounted. A similar cage 28 is suspended from the hook 29 between the cages 26 and 27 so that the air exhausted from the pipes 21 will be compelled to travel a circuitous path to the exit. These cages are filled with a crystalline formaldehyde or some similar disinfectant and germicide which will remove from the air all disease germs as it passes out of the mausoleum. After the body has been properly desiccated the valves 14 and 22 are closed so as to produce a substantially airtight compartment. The compartments 7 are preferably closed by slabs 30 upon which suitable inscriptions may be placed.

When the bodies interred in the vault have died as the result of some contagious or infectious disease, I preferably place in the compartment, in place of the sodium chlorid, a solution containing liquid formaldehyde and place upon that a suitable quantity of crystalline permanganate of potash which, by its violent effervescence creates a highly antiseptic gas. In this instance the burner is not started and the door to the air chamber is temporarily sealed in any suitable manner. This will permit the gases to pass only through the tubes direct to the casket compartments. After the casket compartments have been filled with said gases the stop cocks of the pipes leading into and out of the same are closed, thereby holding the gases in the compartment, preferably for a period of forty-eight hours or more, when all germs in the subject will be destroyed. The process before described is then resorted to to dry out the moisture in the body. In desiccating the bodies a hygrometer is preferably fitted to the upper air chamber so as to determine when there is no moisture in any of the bodies by virtue of the fact that there is no moisture in the air passing out of the upper chamber. When this state of the process is reached the valves are closed and the lower and upper air chambers are preferably filled with cement so as to hermetically seal all of the chambers for all time.

Having thus described the invention, what I claim as new is:—

In combination, a plurality of burial compartments, a fuel compartment, a hot air compartment provided with a fresh air inlet, a container for moisture absorbent within said compartment, and a burner therein communicating with the fuel supply compartment, a common hot air duct leading from the hot air compartment and branch ducts communicating with respective burial compartments, air outlet ducts from each of the burial compartments connected in a series for the final discharge, valves for opening or closing against inflow or outflow of air to and from the burial compartments, a common air chamber above the burial compartments into which all of the air outlet ducts discharge, an air outlet opening from said compartment and disinfectant containers arranged in staggered relation within said outlet, substantially as described.

In testimony whereof I affix my signature in presence of two witnesses.

WARREN L. LAWRENCE.

Witnesses:
  GEORGE JECK,
  EGON DIERKES.